Figure 1:
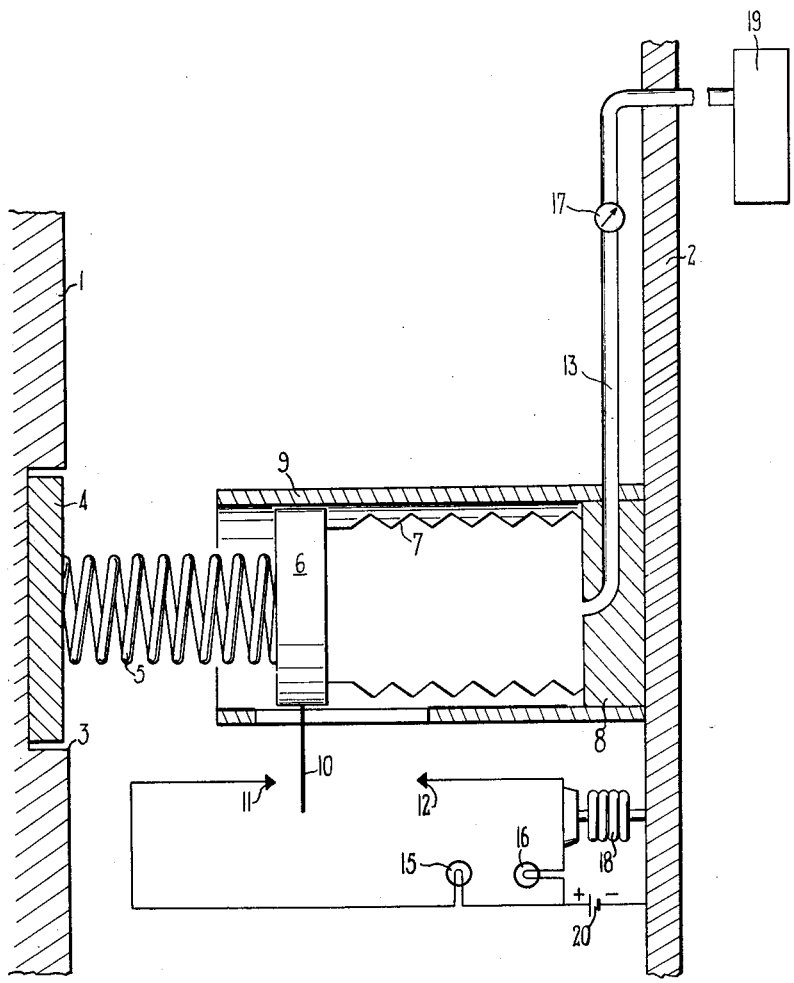

United States Patent Office 3,084,541
Patented Apr. 9, 1963

3,084,541
GAUGE FOR MEASURING THE DISPLACEMENT
OF A BODY
Pierre Rougé, Gif-sur-Yvette, France, assignor to Commissariat a l'Energie Atomique, Paris, France
Filed Feb. 24, 1959, Ser. No. 795,067
Claims priority, application France Feb. 27, 1958
4 Claims. (Cl. 73—141)

The present invention relates to gauges for recovering the displacement of a body, and more particularly to gauges for measuring the displacement of a body which is inaccessible to conventional recovering apparatus.

The invention is particularly applicable to so-called atomic piles, i.e. the cores of heterogeneous nuclear reactors including stacked elements of a solid moderator such as graphite. The moderator material undergoes internal transformation when subjected to nuclear radiation, and especially to bombardment by fast neutrons; such internal transformation may be in the form of crystalline rearrangement leading to variations in the dimensions of the solid thus irradiated.

These variations in dimensions are not isotropic if the exposed solid is itself anisotropic: this is the case, for example, with graphite bars produced by drawing which are used as the moderator in large industrial atomic piles.

Such bars have a preferred direction, which is the drawing axis: the dimensional variation parallel to this axis is a minimum, and the variations are a maximum in a transverse plane (generally being positive in this case). This phenomenon, which is known as the Wigner effect, causes some difficulty since the dimensional variations, which may be as much as several percent, are much greater than those due to thermal expansion.

Methods of stacking the moderator in atomic piles have been proposed which allow of at least partial compensation for Wigner expansion. However, it is still of great advantage if the expansion of an atomic pile can be accurately measured in order to follow temporal alteration in the tension of the stabilising systems, for example, or to determine the periods during which the graphite should be "annealed" or "dewignerised" by heating the pile in order to liberate the stored energy.

Now, in the general case of a cylindrical pile within a pressure vessel, it is impossible for mechanical reasons to pierce orifices in the cylindrical sides of the pressure vessel in order to allow the passage of measuring rods, for example, because of the pressure of cooling fluid which these sides have to withstand. Anything which passes through the vessel must therefore do so in a less critical region such as the ends of the vessel.

An object of the present invention is to porvide a gauge which may be employed to measure the displacement of a body such as a pile of moderator material made inaccessible by the radioactivity of its surroundings and by the necessity of avoiding the passage of measuring apparatus through the sides of the pressure vessel.

The invention provides a gauge for measuring the displacement of a body comprising a resilient member of known elastic characteristics and a datum member movable in opposition thereto, means being provided for giving remote indication of the force exerted by the datum member upon the resilient member when the resilient member is located against the body and the two members are in balance at a predetermined position of the datum member.

In the case of an atomic pile, the body undergoing displacement is the moderator pile itself; for such applications, however, it is necessary to allow for any change in elastic characteristics of the resilient member. With this in mind, the invention also provides a gauge for measuring the displacement of a body comprising a resilient member of known elastic characteristics and a datum member movable in opposition thereto, means being provided for giving remote indication of the force exerted by the datum member upon the resilient member when the resilient member is located against the body and the two members are in balance at two predetermined positions of the datum member a fixed distance apart.

The datum member may be movable by the pressure of fluid acting in a fluid-tight enclosure—for example, the datum member may comprise one end of an expansible metal bellows constituting the enclosure—and the means for giving remote indication of the force exerted by the datum member will then comprise a fluid pressure indicator. In use for measuring the displacement of a moderator pile, the gauge would then be located between the pile and a fixed abutment such as a pressure vessel surrounding the pile. By taking direct readings of the pressure of fluid necessary to bring the datum member into each of the two predetermined positions, the expansion of the pile may be determined at any instant while in operation whatever the change in elastic characteristics—e.g. Young's modulus—of the material of which the resilient member consists.

The resilient member may for example be a spring whose law of deformation and coefficient of elasticity are known. In order to indicate when the datum member is in a predetermined position, an element movable by the datum member may be adapted to be brought into contact with a fixed abutment; the element may for example be an electrical contact and the indication may be in the form of an electric signal.

Figure 2:
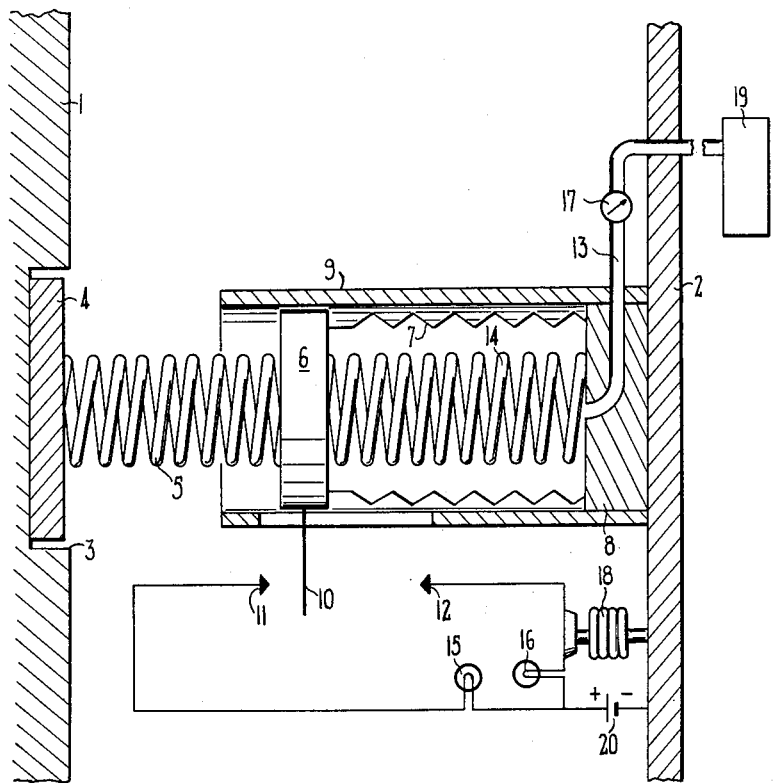

In order that the invention may be clearly understood, two embodiments thereof will now be described by way of example only with reference to the accompanying drawings, in which:

FIGURE 1 is a diagrammatic sectional elevation of the first embodiment, shown in use between the moderator pile and pressure vessel of a nuclear reactor, and FIGURE 2 is a similar view of the second embodiment of the invention.

Only the elements necessary for an understanding of the invention are illustrated in these figures, corresponding elements bearing identical reference numbers.

FIGURE 1 shows a peripheral portion 1 of the moderator pile, made of graphite for example, of a nuclear reactor, and part of a fluid-tight steel pressure vessel 2 disposed round the said pile. A recess 3 is hollowed out in the moderator 1, and a rigid plate 4 is received therein.

A resilient member in the form of a spring 5 of known characteristics is attached at one end to the plate 4, and the other end of the spring 5 is joined to the end 6 of a fluid-tight bellows 7. The other end 8 of the bellows 7 is fast with the pressure vessel 2. The end 6 of the bellows 7 at the joint with the spring 5 is guided in a cylinder 9, and carries a contact element 10 of electrical or other type. During displacement, this contact element can come up against two fixed abutments 11 and 12 fast with the pressure vessel 2. Lamp 15 is connected to abutment 11 and to a source of electricity 20 and is illuminated when contact 10 engages abutment 11. Abutment 12 is connected to lamp 16 and lamp 16 is connected to source 20 to illuminate lamp 16 when contact 10 engages abutment 12. Member 18 is a spring.

Finally, a pipe 13, which passes through the end 8 of the bellows 7 and one end (not illustrated) of the pressure vessel 2, allows the pressure inside the bellows 7 to be regulated and measured from outside the vessel by means of pressure measuring device 17 connected to a source 19 of fluid under pressure.

The gauge operates as follows: when the pile is "new," that is to say before and after its first run under power (the Wigner effect still being entirely negligible), a note is made of the pressures required under cold and hot conditions respectively to make the spring 5 and the bellows 7 balance in the two positions corresponding to the element 10 being in contact with each of the abutments 11 and 12.

Using the following designations:

$x_1^t$ for the length of the spring when expanded, "in position 1," that is to say under the conditions corresponding to the element 10 and the abutment 11 being in contact, at the instant $t$, $x_2^t$ for its length "in position 2," that is to say under the conditions corresponding to the element 10 and the abutment 12 being in contact, at the same instant $t$, $s$ for the effective cross-section of the end 6 of the bellows 7, $K$ for the coefficient of elasticity of the spring 5 when new, $E_0$ for Young's modulus of the material of the spring 5 when new, $E_t$ for Young's modulus of the mtaerial of the spring 5 at the instant $t$, $P_1^0$ for the excess pressure in the bellows 7 with respect to the "new" pile, in position 1, $p_2^0$ for the excess pressure in the bellows 7 with respect to the "new" pile, in position 2, $p_1^t$ for the excess pressure in the bellows 7 with respect to the pile at the instant $t$, in position 1, $p_2^t$ for the excess pressure in the bellows 7 with respect to the pile at the same instant $t$, in position 2 the following relationship first of all results:

(1) $x_2^t - x_1^t = e$ (spacing of the abutments 11 and 12) = constant

Moreover, the displacement $d$ of the moderator pile in a radial direction or expansion of the graphite, is given by the following relationship:

(2) $$d = \frac{s}{K}\left(\frac{p_1^0 - p_2^0}{p_1^t - p_2^t}p_1^t - p_1^0\right)$$

It will be seen that the value of displacement $d$ depends only on the initial characteristics of the gauge and the pressures read off at the instant $t$ when measurement takes place; furthermore, the Relationship 2 takes the following form:

(3) $$d = A\frac{p_1^t}{p_1^t - p_2^t} - B$$

or (4) $$d = A_1\frac{p_1^t}{p_1^t - p_2^t} - B_1$$

in which A and B on the one hand, and $A_1$ and $B_1$ on the other, are constants calculated once and for all, under cold and hot conditions respectively, after the first spread of the pile. To determine the expansion of the pile, it is therefore sufficient to take two pressure readings, provided only that these two readings are taken with the pile at the same internal temperature.

The gauge also allows variations in Young's modulus of a spring exposed to neutron bombardment to be calculated as a function of the total number of neutrons received by the steel of which the said spring is made. There is, in fact, the following simple relationship:

(5) $$E_t = E_0\frac{p_1^t - p_2^t}{p_1^0 - p_2^0}$$

Finally, the gauge also allows differential thermal expansion between the moderator and the fluid-tight pressure vessel to be calculated: for this purpose, it is sufficient to calculate the displacement $d$ from Formula 2 by taking the two values of the pressure when the pile is cold, and the two corresponding pressure values after the first spread of the pile when hot.

In a preferred embodiment of the invention, which is described with reference to FIGURE 2, the causes of possible errors due to flow of the material of the resilient member, caused by irradiation, are eliminated. Metals or alloys exposed to atomic radiation can flow, and this results, in the case of a spring for example, in a decrease in its length when expanded.

Referring to FIGURE 2, a spring 5 of known characteristics is arranged as in the previous embodiment between the moderator pile 1 and the fixed abutment wall of the pressure vessel 2 of a nuclear reactor—with the interposition of a rigid plate 4 in a recess 3. This spring 5 is attached to the end 6 of a fluid-tight bellows 7 whereof the other end 8 is fast with the wall 2.

The end 6 of the bellows 7 is guided as before in a cylinder 9, and carries a contact element 10 (of electrical or other type) which is capable of coming up against two fixed abutments 11 and 12. A pipe 13, passing through the end 8 of the bellows to allow the pressure therein to be regulated, emerges from the radio-active enclosure in a region which is not illustrated.

In this embodiment, a second spring 14, having the same characteristics as the spring 5, but a different number of turns, is fitted inside the bellows 7, and attached to the two ends 6 and 8 of the latter. According to whether the difference in pressure between the interior of the bellows and the radioactive enclosure between the pile and pressure vessel is made positive or negative, the spring 14 has a smaller or larger number of turns than the spring 5.

With this arrangement, any flow in the two springs 5 and 14 cancels out, and measurements of displacement carried out by way of readings of the pressure inside the bellows are independent of any flow phenomenon. In fact, if $L_1^0$ and $L_1^t$ and $L_2^0$ and $L_2^t$, designate respectively the lengths of each spring when expanded at the instant zero, that is to say before irradiation, and at the instant $t$ when measurement takes place, the following relationships result:

(6) $$L_1^t = \beta^t L_1^0$$

and (7) $$L_2^t = \beta^t L_2^0$$

which express the fact that flow is proportional to length, the coefficient $\beta^t$ representing a parameter which only depends on temperature.

Finally, if K designates the coefficient of elasticity of the spring 5 when new, the same notations being used as above, the same value of the displacement $d$ to be measured is obtained:

$$d = \frac{s}{K}\left(\frac{p_1^0 - p_2^0}{p_1^t - p_2^t}p_1^t - p_1^0\right)$$

and the same relationship between Young's moduli at the instants zero and $t$ $$E_t = E_0\frac{p_1^t - p_2^t}{p_1^0 - p_2^0}$$

I claim:

1. An apparatus for measuring the displacement of a solid inaccessible because of a zone of radioactivity, a fixed wall surrounding the solid and the zone, a fluid tight expansible and contractible chamber between the solid and the fixed wall, a movable end for said chamber movable in the axis thereof, a spring of known characteristics between said movable end and the solid, a datum member fixed to said movable end, two fixed abutments of known spacing on opposite sides of and cooperating with said datum member and means outside the zone of radioactivity for supplying fluid under pressure to said chamber and for moving said datum member into successive contact with one and then the other of said abutments and means for measuring the fluid pressure supplied to said chamber, the measured pressures for displacement of said datum member between said abutments providing constants for the apparatus and subsequently measured pressures necessary to displace said datum member between said abutment indicating the amount of displacement of the solid.

2. Apparatus as described in claim 1, in which said chamber and said spring are coaxial.

3. Apparatus as described in claim 1 including a second spring within said chamber opposing said first spring.

4. Apparatus as described in claim 1 including a normally open electric circuit closed by said datum member when in contact with either of said abutments.

References Cited in the file of this patent
UNITED STATES PATENTS

| | | |
|---|---|---|
| 1,580,430 | Gaines | Apr. 13, 1926 |
| 2,032,245 | Wotring | Feb. 25, 1936 |
| 2,571,557 | Fortier | Oct. 16, 1951 |
| 2,680,967 | Newman | June 15, 1954 |
| 2,812,995 | Morris | Nov. 12, 1957 |